(12) United States Patent
Watanabe et al.

(10) Patent No.: US 11,067,530 B2
(45) Date of Patent: Jul. 20, 2021

(54) METHOD OF OPERATION OF A GAS SENSOR

(71) Applicant: NGK INSULATORS, LTD., Aichi (JP)

(72) Inventors: Yusuke Watanabe, Nagoya (JP); Takayuki Sekiya, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 13 days.

(21) Appl. No.: 16/734,620

(22) Filed: Jan. 6, 2020

(65) Prior Publication Data

US 2020/0141894 A1 May 7, 2020

Related U.S. Application Data

(63) Continuation of application No. 15/938,118, filed on Mar. 28, 2018, now abandoned.

(30) Foreign Application Priority Data

Mar. 31, 2017 (JP) .............................. JP2017-070702

(51) Int. Cl.
*G01N 27/407* (2006.01)
*G01N 27/419* (2006.01)

(52) U.S. Cl.
CPC ....... *G01N 27/4071* (2013.01); *G01N 27/419* (2013.01)

(58) Field of Classification Search
CPC .......................... G01N 27/4071; G01N 27/41
See application file for complete search history.

(56) References Cited

U.S. PATENT DOCUMENTS

2015/0276659 A1 10/2015 Sekiya et al.

FOREIGN PATENT DOCUMENTS

JP 2015-200643 A 11/2015

*Primary Examiner* — Luan V Van
*Assistant Examiner* — Caitlyn Mingyun Sun
(74) *Attorney, Agent, or Firm* — Mattingly & Malur, PC (57) ABSTRACT

A method of operation of a gas sensor includes applying a control voltage that is set between the reference electrode and the measurement-object gas side electrode; and detecting the specific gas concentration in the measurement-object gas on the basis of a voltage between the reference electrode and the measurement electrode during a second period, from among a first period that is started upon setting of the control voltage to on state, during which a potential difference between the reference electrode and the measurement-object gas side electrode is large, and the second period that is started upon setting of the control voltage to off state after the potential difference falls from the first period. Tf, a fall time of the potential difference between the first period and the second period, and T2, a second time that is a length of the second period, satisfies Tf≤T2.

5 Claims, 4 Drawing Sheets

METHOD OF OPERATION OF A GAS SENSOR

BACKGROUND OF THE INVENTION

1. Field of the Invention

The present invention relates to a gas sensor and a method of operation of a gas sensor.

2. Description of the Related Art

A conventionally known gas sensor detects a specific gas concentration such as NOx in a measurement-object gas such as an exhaust gas of an automobile. For example, PTL 1 describes a gas sensor including a layered body, a reference electrode, a measurement electrode, and a measurement-object gas side electrode. The layered body is formed by stacking a plurality of oxygen ion-conductive solid electrolyte layers. The reference electrode is formed inside of the layered body and receives a reference gas (e.g., air) introduced therein via a reference gas introducing space. The measurement electrode is provided in a measurement-object gas flowing portion inside the layered body. The measurement-object gas side electrode is provided in a region of the layered body exposed to the measurement-object gas. The gas sensor detects the specific gas concentration in the measurement-object gas on the basis of an electromotive force generated between the reference electrode and the measurement electrode. In addition, the gas sensor further includes a reference gas regulating device that pumps in oxygen to a periphery of the reference electrode by a flow of control current by applying a voltage between the reference electrode and the measurement-object gas side electrode. PTL 1 describes that the reference gas regulating device pumps in oxygen to the periphery of the reference electrode so as to compensate for reduction of the oxygen concentration caused in a case of temporary reduction of the oxygen concentration in the reference gas in the periphery of the reference electrode and to suppress a decrease of the detection accuracy of the specific gas concentration. Note that a case of reduction of the oxygen concentration in the reference gas in the periphery of the reference electrode is a case in which, for example, the measurement-object gas slightly enters the reference gas introducing space.

CITATION LIST

Patent Literature

PTL 1: Japanese Unexamined Patent Application Publication No. 2015-200643

SUMMARY OF THE INVENTION

However, in a case in which oxygen in the periphery of the measurement-object gas side electrode is pumped in to the periphery of the reference electrode, voltage is applied between the electrodes to flow control current, thereby changing the potential of the reference electrode depending on the applied voltage. Thus, the detection accuracy of the specific gas concentration may be decreased in some cases. For example, a change of the potential of the reference electrode also changes the voltage between the reference electrode and the measurement electrode, and thus, the detection accuracy of the specific gas concentration detected on the basis of the voltage may be decreased in some cases.

The present invention has been made to solve such problems, and its main object is to suppress a decrease of the detection accuracy of the specific gas concentration caused by a pump-in control voltage while pumping in oxygen to the periphery of the reference electrode.

In order to achieve the above main object, the present invention is configured as follows.

A gas sensor according to the present invention comprises a layered body that is formed by stacking a plurality of oxygen ion-conductive solid electrolyte layers, and that includes a measurement-object gas flowing portion which a measurement-object gas is introduced and flowed in;

a reference electrode that is formed inside of the layered body, and that receives a reference gas introduced therein, the reference gas being used as a standard for detection of a specific gas concentration in the measurement-object gas;

a measurement electrode provided on an inner peripheral surface of the measurement-object gas flowing portion;

a measurement-object gas side electrode provided in a region of the layered body that is exposed to the measurement-object gas;

a reference gas introducing portion that introduces the reference gas to a periphery of the reference electrode;

a reference gas regulating device that applies a control voltage that is repetitively set to on state and off state between the reference electrode and the measurement-object gas side electrode to pump in oxygen to the periphery of the reference electrode; and a detecting device that detects the specific gas concentration in the measurement-object gas on the basis of a voltage between the reference electrode and the measurement electrode during a second period, from among a first period that is started upon setting of the control voltage to on state, during which a potential difference between the reference electrode and the measurement-object gas side electrode is large, and the second period that is started upon setting of the control voltage to off state after the potential difference falls from the first period, wherein the gas sensor satisfies the following Formula (1).

$$Tf \leq T2 \tag{1}$$

(where Tf is a fall time [msec] of the potential difference between the first period and the second period, and T2 is a second time [msec] that is a length of the second period).

In this gas sensor, the reference gas regulating device applies the control voltage between the reference electrode and the measurement-object gas side electrode to pump in oxygen to the periphery of the reference electrode. Thus, it is possible to compensate for reduction of the oxygen concentration in the periphery of the reference electrode. In addition, since the reference gas regulating device applies the control voltage that is repetitively set to on state and off state, the gas sensor has the first period during which the potential difference between the reference electrode and the measurement-object gas side electrode is large and the second period that is a period after the potential difference between the reference electrode and the measurement-object gas side electrode falls. Since the control voltage less affects the potential of the reference electrode during the second period than during the first period, by the detecting device detecting the specific gas concentration on the basis of the voltage between the reference electrode and the measurement electrode during the second period, a decrease of the detection accuracy of the specific gas concentration can be suppressed. In addition, for example, owing to a capacitance component of the reference electrode or the like, a residual voltage resulting from the control voltage may be present between the reference electrode and the measurement-object gas side electrode even during the second period. This residual voltage affects the potential of the reference electrode. Thus, it is likely that the detection accuracy of the specific gas concentration is increased as the residual voltage is lower. Furthermore, since the gas sensor of the present invention satisfies Formula (1) (i.e., the ratio T2/Tf is not smaller than 1), the second time T2 is made relatively long, and it is possible to sufficiently decrease the residual voltage during the second period. This makes it easier to detect the specific gas concentration with high accuracy during the second period. Accordingly, this gas sensor can suppress a decrease in the detection accuracy of the specific gas concentration caused by the pump-in control voltage while pumping in oxygen to the periphery of the reference electrode. Note that the ratio T2/Tf may be not smaller than 2, or not smaller than 3. The ratio T2/Tf may be not greater than 6.

The fall time Tf is a time that is necessary for the potential difference between the reference electrode and the measurement-object gas side electrode generated by setting the control voltage to on state and off state to fall from 90% to 10% where a difference of the potential difference between its maximum and its minimum is 100%. The start of the second period is a timing at which the potential difference falls to 10%. The end of the second period is a timing at which the potential difference starts to rise upon the control voltage being set to on state after the start of the second period. The phrase "the specific gas concentration in the measurement-object gas is detected on the basis of the voltage between the reference electrode and the measurement electrode during the second period" includes a case in which at least a part of a period for detection of the specific gas concentration slightly deviates from the second period in a range in which the above-described effect can be obtained.

In the gas sensor of the present invention, the peak current Ip3max flowed in the reference electrode by using the control voltage may be not lower than 10 μA. Note that it is likely that the average of the current flowed in the reference electrode by using the control voltage that is repetitively set to on state and off state is increased as the peak current Ip3max flowed in the reference electrode by using the control voltage is higher. In addition, the higher the average of the current flowed in the reference electrode, the more effectively reduction of the oxygen concentration in the periphery of the reference electrode is compensated for. As long as the peak current Ip3max is not lower than 10 μA, it is likely that an effect of compensating for reduction of the oxygen concentration in the periphery of the reference electrode is sufficient. The peak current Ip3max may be 150 μA or less.

In the gas sensor of the present invention, the second time T2 may be 10 msec or less. Note that the average of the current flowed in the reference electrode by using the control voltage that is repetitively set to on state and off state is decreased as the second time T2 is longer. In addition, if the average of the current flowed in the reference electrode is low, it is likely that the effect of compensating for reduction of the oxygen concentration in the periphery of the reference electrode becomes insufficient. As long as the second time T2 is not longer than 10 msec, it is likely that insufficiency of the effect of compensating for reduction of the oxygen concentration in the periphery of the reference electrode is suppressed.

In the gas sensor of the present invention, the fall time Tf may be not longer than 3 msec. Note that it is likely that the residual voltage is decreased more rapidly during the second period as the fall time Tf is shorter. As long as the fall time Tf is 3 msec or less, it is likely that the second time T2 is made relatively short or the residual voltage is sufficiently decreased during the second period while maintaining the detection accuracy of the specific gas concentration.

In the gas sensor of the present invention, a fall residual voltage DVref10 calculated according to the following Formula (2) may be 55 mV or less. If the fall residual voltage DVref10 of the gas sensor measured in the air is 55 mV or less, the fall residual voltage in the measurement-object gas is sufficiently decreased. The lower the fall residual voltage, the lower the residual voltage during the second period, and thus, it is likely that the specific gas concentration is detected with high accuracy during the second period.

$$DVref10 = (Vref2 - Vref1) \times 0.1 + Vref1 - Vref0 \quad (2),$$

(where Vref0 is a voltage [mV] between the reference electrode and the measurement-object gas side electrode in a state in which the layered body is placed in an air and in which the control voltage is not applied, Vref1 is a minimum voltage [mV] between the reference electrode and the measurement-object gas side electrode in a state in which the layered body is placed in the air and in which the control voltage is repetitively set to on state and off state, and Vref2 is a maximum voltage [mV] between the reference electrode and the measurement-object gas side electrode in a state in which the layered body is placed in the air and in which the control voltage is repetitively set to on state and off state.)

In the sensor element of the present invention, the measurement-object gas side electrode may be provided on the outer surface of the layered body. In the gas sensor of the present invention, the sensor element may include an outer electrode provided on the outer surface of the layered body. In addition, the detecting device may pump in or pump out oxygen via the measurement electrode and the outer electrode on the basis of the voltage between the reference electrode and the measurement electrode and may detect the specific gas concentration in the measurement-object gas on the basis of the current at the time of pumping in or pumping out. In this case, the outer electrode may serve as the measurement-object gas side electrode.

DETAILED DESCRIPTION OF THE INVENTION

Figure 1:
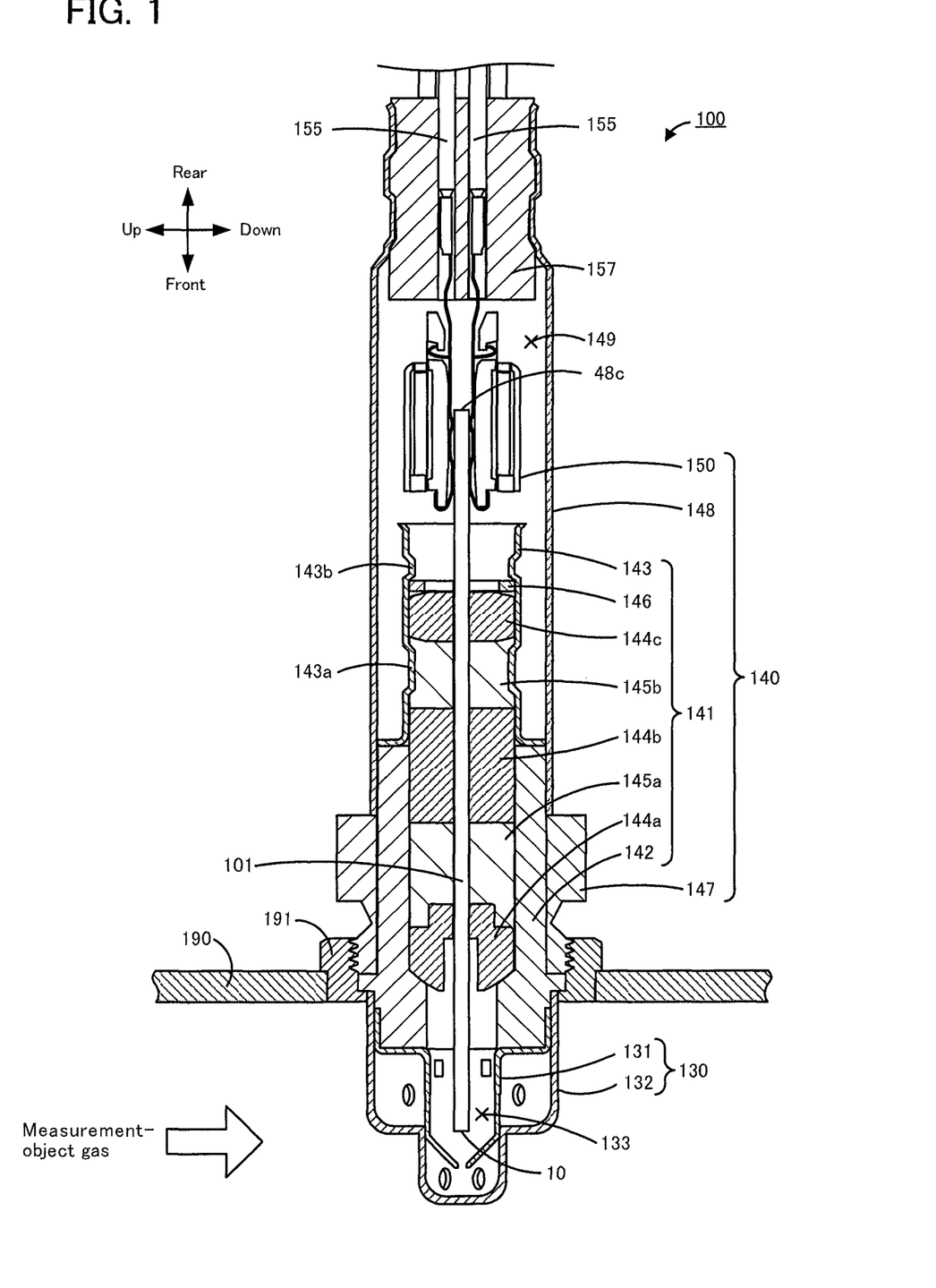
FIG. 1 is a vertical sectional view of a gas sensor 100.
Figure 2:
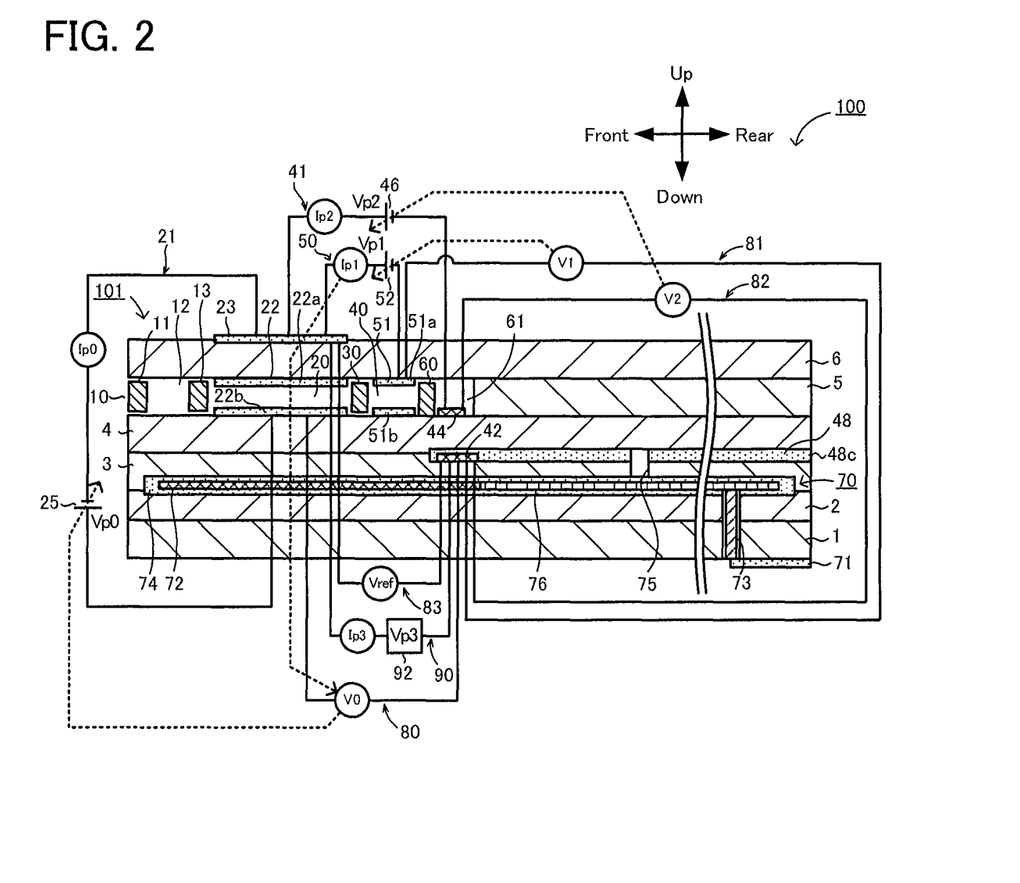
FIG. 2 is a sectional schematic diagram schematically illustrating an example of a configuration of a sensor element 101.

Next, an embodiment of the present invention will be described with reference to the drawings. FIG. 1 is a vertical sectional view of a gas sensor 100, which is an embodiment of the present invention. FIG. 2 is a sectional schematic diagram schematically illustrating an example of a configuration of a sensor element 101 included in the gas sensor 100. The sensor element 101 is in a long rectangular parallelepiped shape. In the description below, a longitudinal direction of the sensor element 101 (left-right direction in FIG. 2) is a front-rear direction, and a thickness direction of the sensor element 101 (vertical direction in FIG. 2) is a vertical direction. A width direction of the sensor element 101 (direction perpendicular to the front-rear direction and the vertical direction) is a left-right direction.

As illustrated in FIG. 1, the gas sensor 100 has the sensor element 101, a protective cover 130 configured to protect a front end side of the sensor element 101, and a sensor assembly 140 including a connector 150 that has continuity with the sensor element 101. This gas sensor 100 is mounted to, for example, a piping 190 such as an exhaust gas pipe of a vehicle as illustrated and is used to measure a specific gas concentration such as NOx or $O_2$ included in an exhaust gas which is a measurement-object gas. According to this embodiment, the gas sensor 100 is used to measure the NOx concentration as the specific gas concentration.

The protective cover 130 includes an inner protective cover 131 in a bottomed cylindrical shape to cover a front end of the sensor element 101 and an outer protective cover 132 in a bottomed cylindrical shape to cover the inner protective cover 131. The inner protective cover 131 and the outer protective cover 132 have a plurality of holes formed to flow the measurement-object gas inside of the protective cover 130. A sensor element chamber 133 is formed as a space surrounded by the inner protective cover 131. The front end of the sensor element 101 is placed in the sensor element chamber 133.

The sensor assembly 140 includes an element sealed body 141 in which the sensor element 101 is sealed and fixed, a nut 147 mounted to the element sealed body 141, an outer cylinder 148, and the connector 150 that is in contact with and is electrically connected with not shown connector electrodes (only a heater connector electrode 71, which will be described later, is shown in FIG. 2) formed on surfaces (upper and lower surfaces) at a rear end of the sensor element 101.

The element sealed body 141 includes a main fitting 142 in a cylindrical shape, an inner cylinder 143 in a cylindrical shape coaxially welded and fixed to the main fitting 142, ceramic supporters 144a to 144c sealed in through holes inside of the main fitting 142 and the inner cylinder 143, green compacts 145a and 145b, and a metal ring 146. The sensor element 101 is located on a center axis of the element sealed body 141 to pass through the element sealed body 141 in the front-rear direction. The inner cylinder 143 has a reduced diameter portion 143a formed to press the green compact 145b in a direction of the center axis of the inner cylinder 143, and a reduced diameter portion 143b formed to press forward the ceramic supporters 144a to 144c and the green compacts 145a and 145b via the metal ring 146. The pressing force from the reduced diameter portions 143a and 143b causes the green compacts 145a and 145b to be compressed between the main fitting 142 or the inner cylinder 143 and the sensor element 101. The green compacts 145a and 145b accordingly seal the sensor element chamber 133 in the protective cover 130 from a space 149 in the outer cylinder 148, while fixing the sensor element 101.

The nut 147 is coaxially fixed to the main fitting 142 and has a male threaded portion formed on its outer peripheral surface. The male threaded portion of the nut 147 is inserted into a fixation member 191 that is welded to the piping 190 and is formed to have a female threaded portion on its inner peripheral surface. The gas sensor 100 is accordingly fixed to the piping 190 in a state in which the front end of the sensor element 101 and the protective cover 130 of the gas sensor 100 are protruded into the piping 190.

The outer cylinder 148 is provided to cover a periphery of the inner cylinder 143, the sensor element 101, and the connector 150. A plurality of lead wires 155 connected with the connector 150 are drawn outside from a rear end of the outer cylinder 148. The lead wires 155 are electrically connected with respective electrodes (described later) of the sensor element 101 via the connector 150. A clearance between the outer cylinder 148 and the lead wires 155 is sealed by a rubber plug 157. The space 149 in the outer cylinder 148 is filled with a reference gas (the air in the embodiment). The rear end of the sensor element 101 is placed in the space 149.

The sensor element 101 is an element of a layered body in which six layers, respectively made of an oxygen ion-conductive solid electrolyte such as zirconia ($ZrO_2$), including a first substrate layer 1, a second substrate layer 2, a third substrate layer 3, a first solid electrolyte layer 4, a spacer layer 5, and a second solid electrolyte layer 6 are stacked in this sequence from a lower side of the drawing. The solid electrolyte forming these six layers is dense and air-tight. The sensor element 101 of this configuration may be manufactured, for example, by making ceramic green sheets corresponding to the respective layers subjected to, for example, predetermined processing and printing of a circuit pattern, stacking the processed green sheets, and firing the stacked green sheets to be integrated.

A gas inlet port 10, a first diffusion controlling portion 11, a buffer space 12, a second diffusion controlling portion 13, a first internal cavity 20, a third diffusion controlling portion 30, a second internal cavity 40, a fourth diffusion controlling portion 60, and a third internal cavity 61 are formed to be adjacent to one another and communicate with one another in this sequence on one end (left end in FIG. 2) of the sensor element 101 and between a lower surface of the second solid electrolyte layer 6 and an upper surface of the first solid electrolyte layer 4.

The gas inlet port 10, the buffer space 12, the first internal cavity 20, the second internal cavity 40, and the third internal cavity 61 are formed as internal spaces of the sensor element 101 by cutting out the spacer layer 5 to have an upper portion defined by the lower surface of the second solid electrolyte layer 6, a lower portion defined by the upper surface of the first solid electrolyte layer 4, and a side portion defined by a side surface of the spacer layer 5.

Each of the first diffusion controlling portion 11, the second diffusion controlling portion 13, and the third diffusion controlling portion 30 is provided in the form of two horizontally long slits (where a longitudinal direction of their openings is a direction perpendicular to the sheet surface). The fourth diffusion controlling portion 60 is provided in the form of one horizontally long slit (where a longitudinal direction of their openings is a direction perpendicular to the sheet surface) that is formed as a clearance from the lower surface of the second solid electrolyte layer 6. A region from the gas inlet port 10 to the third internal cavity 61 is also called a measurement-object gas flowing portion.

An air introducing layer 48 is provided between an upper surface of the third substrate layer 3 and a lower surface of the first solid electrolyte layer 4. The air introducing layer 48 is, for example, made of a ceramic porous material such as alumina. The air introducing layer 48 has a rear end surface serving as an inlet portion 48c, and the inlet portion 48c is exposed to the rear end surface of the sensor element 101.

The inlet portion 48c is exposed to the space 149 illustrated in FIG. 1 (see FIG. 1). The reference gas for measuring the NOx concentration is introduced through the inlet portion 48c into the air introducing layer 48. The reference gas is the air (atmosphere in the space 149 in FIG. 1) in this embodiment. In addition, the air introducing layer 48 is formed to cover a reference electrode 42. The air introducing layer 48 applies a predetermined diffusion resistance to the reference gas introduced from the inlet portion 48c and introduces the resistance-applied reference gas into the reference electrode 42. The air introducing layer 48 may have a thickness of 10 μm or more and 30 μm or less. The air introducing layer 48 may have a porosity of 10 volume % or more and 50 volume % or less.

The reference electrode 42 is an electrode formed between the upper surface of the third substrate layer 3 and the first solid electrolyte layer 4. The air introducing layer 48 is provided in the periphery of the reference electrode 42 as described above. The reference electrode 42 is formed directly on the upper surface of the third substrate layer 3, and a remaining part of the reference electrode 42 other than the part in contact with the upper surface of the third substrate layer 3 is covered by the air introducing layer 48. However, at least a part of the reference electrode 42 has to be covered by the air introducing layer 48. In addition, as will be described later, the oxygen concentrations (oxygen partial pressures) in the first internal cavity 20, in the second internal cavity 40, and in the third internal cavity 61 are measurable by using the reference electrode 42. The reference electrode 42 is formed as a porous cermet electrode (for example, cermet electrode of Pt and $ZrO_2$).

In the measurement-object gas flowing portion, the gas inlet port 10 is a region open to an external space and is arranged such that the measurement-object gas is taken from the external space through the gas inlet port 10 into the sensor element 101. The first diffusion controlling portion 11 is a region that applies a predetermined diffusion resistance to the measurement-object gas taken from the gas inlet port 10. The buffer space 12 is a space provided to lead the measurement-object gas that is introduced from the first diffusion controlling portion 11, to the second diffusion controlling portion 13. The second diffusion controlling portion 13 is a region that applies a predetermined diffusion resistance to the measurement-object gas that is introduced from the buffer space 12 into the first internal cavity 20. In the course of introducing the measurement-object gas from outside of the sensor element 101 into the first internal cavity 20, the measurement-object gas rapidly taken from the gas inlet port 10 into the sensor element 101 by a pressure variation of the measurement-object gas in the external space (pulsation of exhaust gas pressure in a case in which the measurement-object gas is an exhaust gas of an automobile) is not directly introduced into the first internal cavity 20 but is introduced into the first internal cavity 20 after cancellation of a concentration variation of the measurement-object gas through the first diffusion controlling portion 11, the buffer space 12, and the second diffusion controlling portion 13. This reduces the concentration variation of the measurement-object gas introduced into the first internal cavity 20 to a substantially negligible level. The first internal cavity 20 is provided as a space to regulate the oxygen partial pressure in the measurement-object gas introduced through the second diffusion controlling portion 13. The oxygen partial pressure is regulated by operation of a main pump cell 21.

The main pump cell 21 is an electrochemical pump cell, which includes an inner pump electrode 22 having a top electrode portion 22a provided over a substantially entire lower surface of the second solid electrolyte layer 6 facing the first internal cavity 20, an outer pump electrode 23 provided in a region corresponding to the top electrode portion 22a on an upper surface of the second solid electrolyte layer 6 to be exposed to an external space (sensor element chamber 133 in FIG. 1), and the second solid electrolyte layer 6 placed between these electrodes 22 and 23.

The inner pump electrode 22 is formed across the upper and lower solid electrolyte layers (the second solid electrolyte layer 6 and the first solid electrolyte layer 4) defining the first internal cavity 20 and the spacer layer 5 forming the side wall. Specifically, the top electrode portion 22a is formed on the lower surface of the second solid electrolyte layer 6 that forms a top surface of the first internal cavity 20. A bottom electrode portion 22b is formed directly on the upper surface of the first solid electrolyte layer 4 that forms a bottom surface of the first internal cavity 20. Side electrode portions (omitted from illustrations) are formed on side wall surfaces (inner surfaces) of the spacer layer 5 that form both side wall portions of the first internal cavity 20, such as to connect the top electrode portion 22a with the bottom electrode portion 22b and provide a tunnel-like structure in the region where the side electrode portions are provided.

The inner pump electrode 22 and the outer pump electrode 23 are formed as porous cermet electrodes (for example, cermet electrodes of Pt and $ZrO_2$ containing 1% Au). The inner pump electrode 22 in contact with the measurement-object gas is made of a material having the decreased reducing ability with regard to the NOx component in the measurement-object gas.

The main pump cell 21 is capable of pumping out oxygen from the first internal cavity 20 to the external space or pumping in oxygen from the external space to the first internal cavity 20 by applying a desired pump voltage Vp0 between the inner pump electrode 22 and the outer pump electrode 23 and making a pump current Ip0 flow in a positive direction or a negative direction between the inner pump electrode 22 and the outer pump electrode 23.

In order to detect the oxygen concentration (oxygen partial pressure) in the atmosphere of the first internal cavity 20, the inner pump electrode 22, the second solid electrolyte layer 6, the spacer layer 5, the first solid electrolyte layer 4, and the reference electrode 42 constitute an electrochemical sensor cell, that is, a main pump-controlling oxygen partial pressure detection sensor cell 80.

The oxygen concentration (oxygen partial pressure) in the first internal cavity 20 is determined by measuring an electromotive force V0 in the main pump-controlling oxygen partial pressure detection sensor cell 80. The pump current Ip0 is controlled by feedback control of the pump voltage Vp0 of a variable power supply 25 to keep the electromotive force V0 constant. This maintains the oxygen concentration in the first internal cavity 20 at a predetermined constant value.

The third diffusion controlling portion 30 is a region that applies a predetermined diffusion resistance to the measurement-object gas with the oxygen concentration (oxygen partial pressure) controlled by operation of the main pump cell 21 in the first internal cavity 20 and leads the resistance-applied measurement-object gas to the second internal cavity 40.

The second internal cavity 40 is provided as a space to further regulate the oxygen partial pressure by means of an auxiliary pump cell 50 with respect to the measurement-object gas introduced through the third diffusion controlling portion 30 after regulation of the oxygen concentration (oxygen partial pressure) in the first internal cavity 20. This maintains the oxygen concentration in the second internal cavity 40 constant with high accuracy and thus enables the gas sensor 100 to measure the NOx concentration with high accuracy.

The auxiliary pump cell 50 is an auxiliary electrochemical pump cell, which includes an auxiliary pump electrode 51 having a top electrode portion 51a provided over a substantially entire lower surface of the second solid electrolyte layer 6 facing the second internal cavity 40, the outer pump electrode 23 (or any appropriate electrode outside of the sensor element 101 in place of the outer pump electrode 23), and the second solid electrolyte layer 6.

The auxiliary pump electrode 51 is provided to have a tunnel-like structure like the inner pump electrode 22 provided in the first internal cavity 20 and is placed in the second internal cavity 40. That is, the top electrode portion 51a is formed on the second solid electrolyte layer 6 that forms a top surface of the second internal cavity 40. A bottom electrode portion 51b is formed directly on the upper surface of the first solid electrolyte layer 4 that forms a bottom surface of the second internal cavity 40. Side electrode portions (omitted from illustrations) are formed on side wall surfaces of the spacer layer 5 that form side walls of the second internal cavity 40, such as to connect the top electrode portion 51a with the bottom electrode portion 51b and provide a tunnel-like structure.

Like the inner pump electrode 22, the auxiliary pump electrode 51 is made of a material having the decreased reducing ability with regard to the NOx component in the measurement-object gas.

The auxiliary pump cell 50 is capable of pumping out oxygen in the atmosphere from the second internal cavity 40 to the external space or pumping in oxygen from the external space to the second internal cavity 40 by applying a desired voltage Vp1 between the auxiliary pump electrode 51 and the outer pump electrode 23.

In order to control the oxygen partial pressure in the atmosphere of the second internal cavity 40, the auxiliary pump electrode 51, the reference electrode 42, the second solid electrolyte layer 6, the spacer layer 5, and the first solid electrolyte layer 4 constitute an electrochemical sensor cell, that is, an auxiliary pump-controlling oxygen partial pressure detection sensor cell 81.

The auxiliary pump cell 50 performs pumping at a variable power supply 52 under voltage control based on an electromotive force V1 detected by the auxiliary pump-controlling oxygen partial pressure detection sensor cell 81. This controls the oxygen partial pressure in the atmosphere of the second internal cavity 40 to such a low partial pressure that substantially does not affect the measurement of NOx.

Additionally, its pump current Ip1 is used to control the electromotive force of the main pump-controlling oxygen partial pressure detection sensor cell 80. Specifically, the pump current Ip1 is input as a control signal into the main pump-controlling oxygen partial pressure detection sensor cell 80 to control its electromotive force V0. This control maintains a constant slope of the oxygen partial pressure in the measurement-object gas that is introduced from the third diffusion controlling portion 30 into the second internal cavity 40. In a case in which the gas sensor 100 is used as a NOx sensor, the oxygen concentration in the second internal cavity 40 is maintained at a constant level of approximately 0.001 ppm by the operation of the main pump cell 21 and the auxiliary pump cell 50.

The fourth diffusion controlling portion 60 is a region that applies a predetermined diffusion resistance to the measurement-object gas with the oxygen concentration (oxygen partial pressure) controlled by operation of the auxiliary pump cell 50 in the second internal cavity 40 and leads the resistance-applied measurement-object gas to the third internal cavity 61. The fourth diffusion controlling portion 60 serves to limit the amount of NOx flowing into the third internal cavity 61.

The third internal cavity 61 is provided as a space to further perform a process on the measurement-object gas introduced through the fourth diffusion controlling portion 60 after regulation of the oxygen concentration (oxygen partial pressure) in the second internal cavity 40, the process being related to measurement of the concentration of nitrogen oxides (NOx) in the measurement-object gas. Measurement of the NOx concentration is mainly performed in the third internal cavity 61 by operation of a measurement pump cell 41.

The measurement pump cell 41 measures the NOx concentration in the measurement-object gas in the third internal cavity 61. The measurement pump cell 41 is an electrochemical pump cell, which includes a measurement electrode 44 provided directly on an upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode. The measurement electrode 44 also serves as a NOx reducing catalyst to reduce NOx present in the atmosphere of the third internal cavity 61.

The measurement pump cell 41 is capable of pumping out oxygen produced by degradation of nitrogen oxides in the ambient atmosphere of the measurement electrode 44 and detecting the production amount of oxygen as a pump current Ip2.

In order to detect the oxygen partial pressure in the periphery of the measurement electrode 44, the first solid electrolyte layer 4, the measurement electrode 44, and the reference electrode 42 constitute an electrochemical sensor cell, that is, a measurement pump-controlling oxygen partial pressure detection sensor cell 82. A variable power supply 46 is controlled on the basis of an electromotive force (voltage V2) detected by the measurement pump-controlling oxygen partial pressure detection sensor cell 82.

The measurement-object gas introduced into the second internal cavity 40 passes through the fourth diffusion controlling portion 60 with the oxygen partial pressure controlled and reaches the measurement electrode 44 in the third internal cavity 61. Nitrogen oxides in the measurement-object gas in the periphery of the measurement electrode 44 are reduced to produce oxygen ($2NO \rightarrow N_2 + O_2$). The produced oxygen is subjected to pumping by the measurement pump cell 41. In this process, a voltage Vp2 of the variable power supply 46 is controlled to maintain constant the voltage V2 detected by the measurement pump-controlling oxygen partial pressure detection sensor cell 82. Since the amount of oxygen produced in the periphery of the measurement electrode 44 is proportional to the concentration of nitrogen oxides in the measurement-object gas, the concentration of nitrogen oxides in the measurement-object gas is calculated by using the pump current Ip2 of the measurement pump cell 41.

The second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside of the sensor is detectable by using an electromotive force (voltage Vref) obtained by this sensor cell 83.

Additionally, the second solid electrolyte layer 6, the spacer layer 5, the first solid electrolyte layer 4, the third substrate layer 3, the outer pump electrode 23, and the reference electrode 42 constitute an electrochemical reference gas regulation pump cell 90. The reference gas regulation pump cell 90 performs pumping by means of a control current Ip3 flowed by using a control voltage Vp3 applied by a power supply circuit 92 connected between the outer pump electrode 23 and the reference electrode 42. The reference gas regulation pump cell 90 accordingly pumps in oxygen from an ambient space of the outer pump electrode 23 (sensor element chamber 133 in FIG. 1) to an ambient space of the reference electrode 42 (air introducing layer 48).

In the gas sensor 100 having the above configuration, the measurement pump cell 41 receives the measurement-object gas with the oxygen partial pressure maintained at a constant low value (value that does not substantially affect the measurement of NOx) by the operation of the main pump cell 21 and the auxiliary pump cell 50. Accordingly, the NOx concentration in the measurement-object gas is determinable, on the basis of the pump current Ip2 flowed by the measurement pump cell 41 pumping out oxygen produced by reduction of NOx approximately in proportion to the concentration of NOx in the measurement-object gas.

Additionally, the sensor element 101 is provided with a heater unit 70 serving to adjust a temperature to heat the sensor element 101 and keep the sensor element 101 warm, in order to enhance the oxygen ion conductivity of the solid electrolyte. The heater unit 70 includes a heater connector electrode 71, a heater 72, a through hole 73, a heater insulating layer 74, a pressure release hole 75, and a lead wire 76.

The heater connector electrode 71 is an electrode formed to be in contact with a lower surface of the first substrate layer 1. Connecting the heater connector electrode 71 with an external power supply allows for external power feeding to the heater unit 70.

The heater 72 is an electric resistor formed to be placed between the second substrate layer 2 and the third substrate layer 3. The heater 72 is connected with the heater connector electrode 71 via the lead wire 76 and the through hole 73 and generates heat by external power feeding through the heater connector electrode 71 to heat the solid electrolyte included in the sensor element 101 and keep the solid electrolyte warm.

The heater 72 is embedded over an entire area from the first internal cavity 20 to the third internal cavity 61 and is capable of adjusting the entire sensor element 101 to a temperature at which the solid electrolyte is activated.

The heater insulating layer 74 is an insulating layer of porous alumina formed from an insulating material such as alumina on upper and lower surfaces of the heater 72. The heater insulating layer 74 is formed to provide electrical insulation between the second substrate layer 2 and the heater 72 and electrical insulation between the third substrate layer 3 and the heater 72.

The pressure release hole 75 is a region provided to pass through the third substrate layer 3 and the air introducing layer 48 and is formed to relieve an increase in internal pressure accompanied with a temperature rise in the heater insulating layer 74.

The variable power supplies 25, 46, and 52 and the power supply circuit 92 illustrated in FIG. 2 and the like are actually connected with the respective electrodes via lead wires (not shown) formed in the sensor element 101 and the connector 150 and the lead wires 155 illustrated in FIG. 1.

The following describes an example of a manufacturing method of the gas sensor 100. First, six unfired ceramic green sheets are prepared, each containing an oxygen ion-conductive solid electrolyte such as zirconia as the ceramic component. A plurality of sheet holes used for positioning in printing or in stacking, a plurality of required through holes, and the like are formed in advance in the respective green sheets. A space forming the measurement-object gas flowing portion is provided in advance by, for example, punching in the green sheet for the spacer layer 5. Subsequently, a pattern printing process and a drying process are performed to form various patterns in the respective ceramic green sheets respectively corresponding to the first substrate layer 1, the second substrate layer 2, the third substrate layer 3, the first solid electrolyte layer 4, the spacer layer 5, and the second solid electrolyte layer 6. Specifically, the patterns formed include, for example, the respective electrodes described above, lead wires connecting with the respective electrodes, the air introducing layer 48, and the heater unit 70. The pattern printing is performed by applying pattern-forming paste provided according to the properties required for each object on the green sheet by a known screen printing technique. The drying process also employs any known drying technique. On completion of pattern printing and drying, the procedure performs a printing and drying process to print and dry an adhesive paste for stacking and bonding the green sheets corresponding to the respective layers. The procedure then performs a press bonding process to position the respective green sheets with the adhesive paste by aligning the sheet holes, stack the respective green sheets in a predetermined sequence, and pressure bond the respective green sheets under predetermined temperature and pressure conditions to form one layered body. The resulting layered body includes a plurality of sensor elements 101. The layered body is cut into the size of the sensor elements 101. Each of the cut-out piece of the layered body is fired at a predetermined firing temperature to provide the sensor element 101.

After obtaining the sensor element 101, the procedure produces the sensor assembly 140 (see FIG. 1) with the sensor element 101 built therein and mounts the components such as the protective cover 130 and the rubber plug 157 to the sensor assembly 140 to complete the gas sensor 100.

The following describes the functions of the reference gas regulation pump cell 90 in detail. The measurement-object gas is introduced from the sensor element chamber 133 illustrated in FIG. 1 to the measurement-object gas flowing portion of the sensor element 101 including, for example, the gas inlet port 10. The reference gas (air) in the space 149 illustrated in FIG. 1 is, on the other hand, introduced into the air introducing layer 48 of the sensor element 101. The sensor element chamber 133 and the space 149 are separated from each other by the sensor assembly 140 (especially the green compacts 145*a* and 145*b*) and are sealed to prevent the gas from flowing therebetween. When the pressure of the measurement-object gas is temporarily increased, however, the measurement-object gas may slightly enter the space 149. This causes temporary reduction of the oxygen concentration in the periphery of the reference electrode 42 and thereby results in changing the reference potential that is the potential of the reference electrode 42. This may change a voltage based on the reference electrode 42, for example, the voltage V2 of the measurement pump-controlling oxygen partial pressure detection sensor cell 82 and decrease the detection accuracy of the NOx concentration in the measurement-object gas. The reference gas regulation pump cell 90 serves to suppress such a decrease of the detection accuracy. The reference gas regulation pump cell 90 pumps in oxygen from the periphery of the outer pump electrode 23 to the periphery of the reference electrode 42 by the flow of the control current Ip3 by applying the control voltage Vp3 between the reference electrode 42 and the outer pump electrode 23. As described above, this compensates for reduction of oxygen and suppresses a decrease of the detection accuracy of the NOx concentration when the measurement-object gas has temporarily reduced the oxygen concentration in the periphery of the reference electrode 42.

Figure 3:
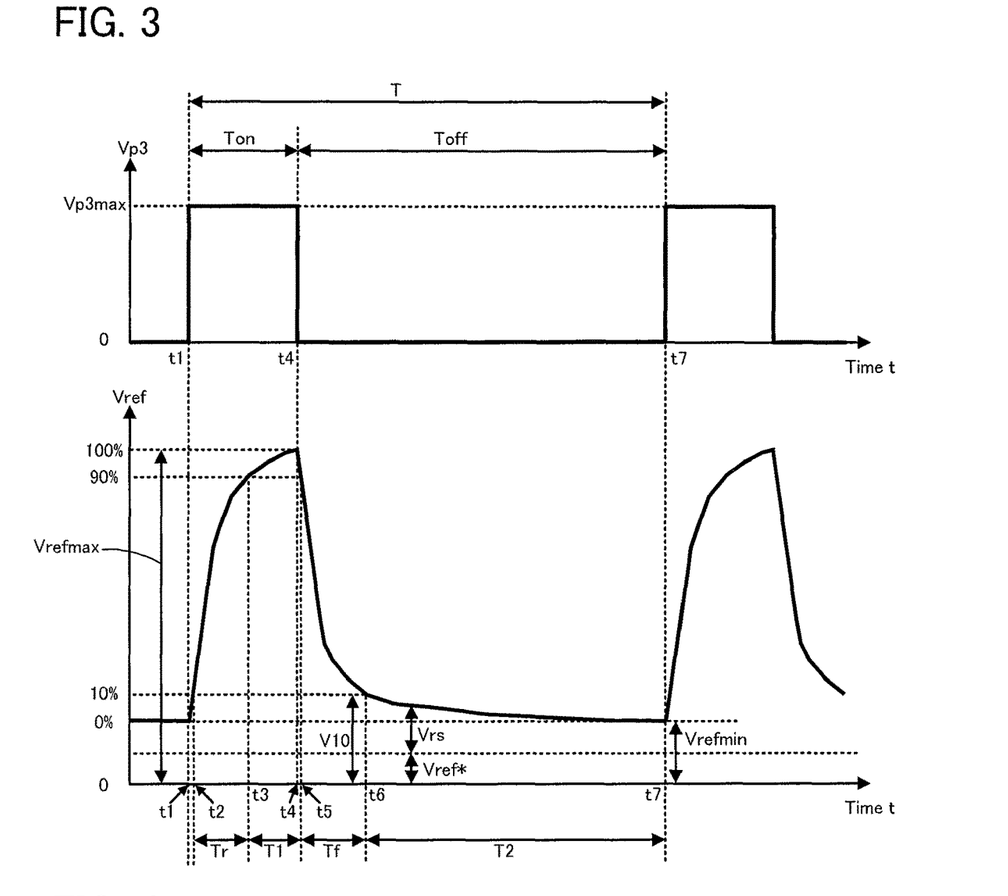
FIG. 3 is an explanatory diagram illustrating a temporal change of a control voltage Vp3 and a voltage Vref.

The power supply circuit 92 of the reference gas regulation pump cell 90 applies a voltage that is repetitively set to on state and off state as the control voltage Vp3. Thus, there are a first period during which the voltage Vref between the reference electrode 42 and the outer pump electrode 23 has a large value (=potential difference between the reference electrode 42 and the outer pump electrode 23), and a second period during which the voltage Vref has a small value. FIG. 3 is an explanatory diagram illustrating a temporal change of the control voltage Vp3 and the voltage Vref. The upper part of FIG. 3 illustrates a temporal change of the control voltage Vp3, and the lower part illustrates a temporal change of the voltage Vref. The control voltage Vp3 and the voltage Vref are positive if the potential of the reference electrode 42 is higher than that of the outer pump electrode 23, and the up direction of the vertical axis in FIG. 3 is a positive direction. As illustrated in FIG. 3, the control voltage Vp3 is a voltage having a pulse waveform that is repetitively set to on state and off state in a cycle T. For example, when the control voltage Vp3 is set to on state at time t1, the control voltage Vp3 rises from 0 V to a maximum voltage Vp3max, and this state is continued until time t4 at which an on time Ton comes. When the control voltage Vp3 is set to off state at time t4, the control voltage Vp3 remains at 0 V until time t7 at which an off time Toff comes. With this control voltage Vp3, the voltage Vref starts to rise at time t1 to become a maximum voltage Vrefmax at time t4, and starts to fall at time t4 to become a minimum voltage Vrefmim at time t7. At this time, a difference between the maximum voltage Vrefmax and the minimum voltage Vrefmim of the voltage Vref, generated by the control voltage Vp3 set to on state and off state, is determined as 100%, and by using this as a standard, a rise period, the first period, a fall period, and the second period of the voltage Vref are determined. Specifically, a period during which the voltage Vref rises from 10% to 90% (time t2 to t3) is determined as the rise period, and the length thereof is determined as a rise time Tr. A period during which the voltage Vref remains to 90% or more (time t3 to t5) is determined as the first period, and the length thereof is determined as a first time T1. A period during which the voltage Vref falls from 90% to 10% (time t5 to t6) is determined as the fall period, and the length thereof is determined as a fall time Tf. A period from when the voltage Vref falls to 10% to when the voltage Vref starts to rise in response to the control voltage Vp3 set to on state in the next cycle (time t6 to t7) is determined as the second period, and the length thereof is determined as a second time T2. The voltage Vref at the start of the second period, that is, the voltage obtained when the voltage Vref falls to 10%, is determined as a fall voltage V10. Note that the voltage Vref in FIG. 3 becomes the maximum voltage Vrefmax for the first time at time t4 at which the control voltage Vp3 falls. However, in a case in which the on time Ton is long, the voltage Vref can reach the maximum voltage Vref before time t4.

The measurement pump cell 41 detects the NOx concentration in the measurement-object gas on the basis of the voltage V2 during the second period. More specifically, during the second period, the measurement pump cell 41 acquires the value of the voltage V2, performs feedback control of the voltage Vp2 of the variable power supply 46 so as to maintain the voltage V2 at a predetermined constant value, and detects the value of the pump current Ip2 flowed by using the voltage Vp2. Since the measurement pump cell 41 detects the NOx concentration (the pump current Ip2 here) during the second period in this manner, it is possible to suppress a decrease of the detection accuracy of the NOx concentration caused by the control voltage Vp3 used for pumping in oxygen to the measurement electrode 44. For example, a case in which the measurement pump cell 41 measures the NOx concentration during the first period is considered. In this case, since the control voltage Vp3 is set to on state during the first period, unlike during the second period, the voltage Vref is changed to be higher than a voltage Vref* that is a supposed value (voltage based on an oxygen concentration difference between the periphery of the reference electrode 42 and the periphery of the outer pump electrode 23). This changes the potential of the reference electrode 42 and also changes the voltage V2. Accordingly, if the measurement pump cell 41 flows the pump current Ip2 on the basis of the voltage V2 during the first period, it is likely that the pump current Ip2 deviates from the correct value representing the NOx concentration and that the detection accuracy of the NOx concentration is decreased. In contrast, during the second period, the control voltage Vp3 less affects the potential of the reference electrode 42 than during the first period. Specifically, the voltage Vref during the second period after the voltage Vref has fallen is a value closer to the voltage Vref* than the voltage Vref during the first period. Thus, by the measurement pump cell 41 measuring the NOx concentration during the second period, a decrease of the detection accuracy of the NOx concentration can be suppressed.

As seen in FIG. 3, the voltage Vref is decreased by taking a long time from the timing at which the control voltage Vp3 is set to off state. This is considered to be resulting from a capacitance component of the reference electrode 42 or the like, for example. Thus, even during the second period, a residual voltage Vrs resulting from the control voltage Vp3 may be present between the reference electrode 42 and the outer pump electrode 23. In this case, for example, the voltage Vref during the second period is the sum of the voltage Vref* and the residual voltage Vrs. Since the residual voltage Vrs affects the potential of the reference electrode 42, it is likely that the detection accuracy of the NOx concentration is increased as the residual voltage Vrs is decreased. Therefore, the residual voltage Vrs is preferably as low as possible. For example, the fall voltage V10 is preferably as low as possible, and the minimum voltage Vrefmin is preferably as low as possible. In addition, since the residual voltage Vrs is decreased over time also during the second period, it is likely that a decrease of the detection accuracy of the NOx concentration is suppressed more effectively as the time is closer to the end of the second period (t7 in FIG. 3). Accordingly, the measurement pump cell 41 preferably detects the NOx concentration at a timing as later as possible during the second period. Furthermore, a period required for the measurement pump cell 41 to detect the NOx concentration (e.g., the above-described period from the detection of the voltage V2 to the detection of the value of the pump current Ip2) is preferably included in the second period. The measurement pump cell 41 preferably detects the NOx concentration in the same cycle T as the setting of the control voltage Vp3 to on state and off state. In this manner, it is possible to repetitively detect the NOx concentration at the same timing during the second period at each cycle T.

In addition, the gas sensor 100 satisfies the following Formula (1). That is, in this embodiment, the second time T2 is made relatively long.

$$Tf \leq T2 \tag{1}$$

(where Tf is a fall time [msec] of a potential difference between the first period and the second period, and T2 is the second time [msec] that is the length of the second period)

Note that the longer the second time T2, the lower the residual voltage Vrs becomes during the second period, and the minimum voltage Vrefmin is also further decreased. In other words, a difference between the minimum voltage Vrefmin and the voltage Vref* is reduced. As long as Formula (1) is satisfied, that is, as long as the ratio T2/Tf is 1 or more, the residual voltage Vrs is sufficiently decreased during the second period, and thus, it is likely that the NOx concentration is detected with high accuracy during the second period. For example, unless Formula (1) is satisfied, even if the measurement pump cell 41 detects the NOx concentration at a timing as later as possible during the second period, the detection accuracy of the NOx concentration may be decreased; however, as long as the Formula (1) is satisfied, such a decrease can be suppressed. In addition, the longer the second time T2 (the larger the ratio T2/Tf), the lower the minimum voltage Vrefmin. Accordingly, if the NOx concentration is detected at a timing as later as possible during the second period, the detection accuracy of the NOx concentration is increased. Alternatively, the longer the second time T2, the longer the period during which the NOx concentration can be detected with high accuracy during the second period. The ratio T2/Tf may be 2 or more, or 3 or more. The ratio T2/Tf may be 6 or less. It is likely that the NOx concentration is detected with higher accuracy during the second period as the ratio T2/Tf is larger.

The peak current Ip3max flowed in the reference electrode 42 by using the control voltage Vp3 is preferably not lower than 10 μA. The waveform of the control current Ip3 flowed in the reference electrode 42 by using the control voltage Vp3 has in principle the same phase as the waveform of the voltage Vref illustrated in FIG. 3. The peak current Ip3max is the value of the control current Ip3 flowed when the voltage Vref becomes the maximum voltage Vrefmax. Note that it is likely that the average of the current Ip3 flowed in the reference electrode 42 by using the control voltage Vp3 that is repetitively set to on state and off state (average current in the cycle T) is increased as the peak current Ip3max is higher. In addition, the higher the average of the current Ip3 flowed in the reference electrode 42, the more effectively reduction of the oxygen concentration in the periphery of the reference electrode 42 is compensated for. As long as the peak current Ip3max is 10 μA or more, it is likely that the effect of compensating for reduction of the oxygen concentration in the periphery of the reference electrode 42 is sufficient. The peak current Ip3max may be 5 μA or more, or 10 μA or more. The peak current Ip3max may be 300 μA or less, or 150 μA or less. The value of the average of the control current Ip3 can be determined in advance by experiment or the like on the basis of how much the oxygen concentration in the periphery of the reference electrode 42 is decreased (how much oxygen needs to be pumped in to the periphery of the reference electrode 42) when the pressure of the measurement-object gas is an assumable maximum. Therefore, the peak current Ip3max may be determined by taking into account the thus determined average of the control current Ip3.

The higher the average of the current Ip3 flowed in the reference electrode 42 (average current in the cycle T), the more likely it is that degradation occurs, such as fining of grains constituting the reference electrode 42, and thereby it is more likely that the resistance of the reference electrode 42 is increased in long time use. Once the resistance of the reference electrode 42 is increased, the reference potential that is the potential of the reference electrode 42 is changed, and the voltage V2 based on the reference electrode 42 is changed. Thus, the detection accuracy of the NOx concentration in the measurement-object gas is decreased. This is different from a temporary change of the reference potential resulting from, for example, the above-described reduction of the oxygen concentration in the measurement-object gas in the periphery of the reference electrode 42 and is constant reduction of the sensitivity caused by the degradation of the reference electrode 42. Accordingly, by decreasing the average of the current Ip3, it is possible to suppress the degradation of the reference electrode 42 in long time use and to suppress a decrease of the detection accuracy of the NOx concentration. The higher the peak current Ip3max, the higher the average of the current Ip3; the longer the second time T2, the lower the average of the current Ip3. Thus, the peak current Ip3max and the second time T2 are preferably determined so as to prevent the average of the current Ip3 from being excessively high.

The second time T2 is preferably 10 msec or less. Note that the longer the second time T2, the lower the above-described average of the current Ip3. In addition, it is likely that a low average of the current Ip3 flowed in the reference electrode 42 results in insufficiency of the effect of compensating for reduction of the oxygen concentration in the periphery of the reference electrode 42. As long as the second time T2 is not longer than 10 msec, it is likely that insufficiency of the effect of compensating for reduction of the oxygen concentration in the periphery of the reference electrode 42 is suppressed.

The fall time Tf is preferably 3 msec or less. Note that it is likely that the residual voltage Vrs is decreased more rapidly during the second period as the fall time Tf is shorter. As long as the fall time Tf is 3 msec or less, it is likely that the second time T2 is made relatively short or the residual voltage Vrs is sufficiently decreased during the second period while maintaining the detection accuracy of the NOx concentration.

As an index of a low residual voltage Vrs, the fall residual voltage DVref10 of the gas sensor 100, calculated according to the following Formula (2), is preferably 55 mV or less.

$$DVref10 = (Vref2 - Vref1) \times 0.1 + Vref1 - Vref0 \tag{2},$$

(where Vref0 is a voltage [mV] between the reference electrode and the measurement-object gas side electrode in a state in which the layered body is placed in an air and in which the control voltage is not applied, Vref1 is a minimum voltage [mV] between the reference electrode and the measurement-object gas side electrode in a state in which the layered body is placed in the air and in which the control voltage is repetitively set to on state and off state, and Vref2 is a maximum voltage [mV] between the reference electrode and the measurement-object gas side electrode in a state in which the layered body is placed in the air and in which the control voltage is repetitively set to on state and off state.)

Figure 4:
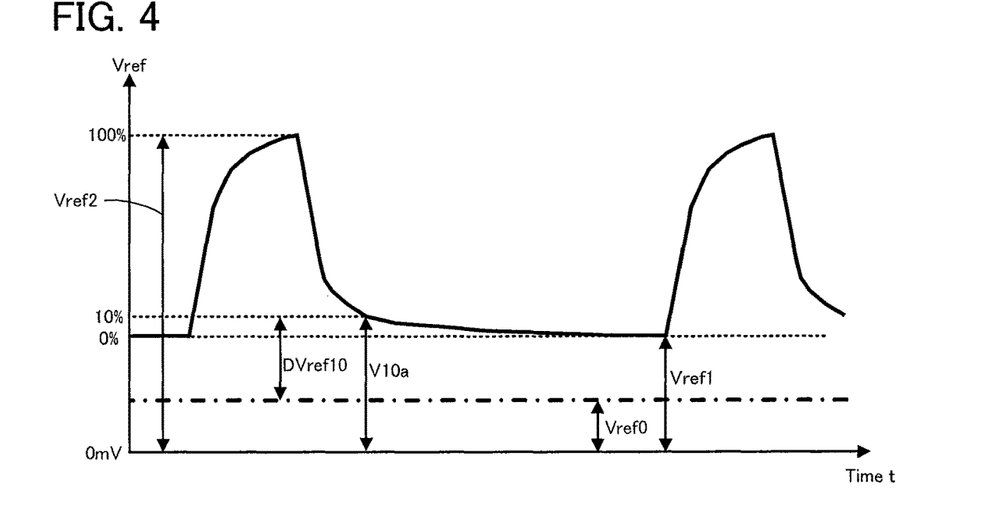
FIG. 4 is an explanatory diagram of a fall residual voltage DVref10.

FIG. 4 is an explanatory diagram of the fall residual voltage DVref10. As seen in the above definition and FIG. 4, the voltage Vref2 corresponds to the value of the maximum voltage Vrefmax of the voltage Vref in FIG. 3 measured in the air. The voltage Vref1 corresponds to the value of the minimum voltage Vrefmim during the second period in FIG. 3 measured in the air. "(Vref2−Vref1)×0.1+Vref1" in Formula (2) corresponds to a fall voltage V10a illustrated in FIG. 4. The fall voltage V10a corresponds to the value of the fall voltage V10 in FIG. 3 measured in the air. The voltage Vref0 corresponds to the value of the voltage Vref* in FIG. 3 measured in the air. The fall residual voltage DVref10 corresponds to the value of the residual voltage Vrs at a fall, that is, at the start of the second period in FIG. 3 (=fall voltage V10−voltage Vref*) measured in the air. In a case in which the sensor element 101 is placed in the air, since there is no oxygen concentration difference between the periphery of the outer pump electrode 23 and the periphery of the reference electrode 42, the value of the voltage Vref0 is theoretically 0. However, the value of the voltage Vref0 is not actually 0 as a result of a thermoelectromotive force due to a temperature difference between electrodes or the like. Note that since a thermoelectromotive force of the same value is also included in the fall voltage V10, the value of the thermoelectromotive force does not affect the fall residual voltage DVref10. Technically speaking, the above-described voltage Vref* in FIG. 3 also includes the thermoelectromotive force. As long as the fall residual voltage DVref10 of the gas sensor 100 is 55 mV or less, the fall residual voltage Vrs (fall voltage V10−voltage Vref*) in the measurement-object gas is sufficiently low, and accordingly, the lower the residual voltage Vrs at the fall, the lower the residual voltage Vrs during the second period, and thus, it is likely that the specific gas concentration is detected with high accuracy during the second period. The lower the fall residual voltage DVref10, the more effectively a decrease of the detection accuracy of the NOx concentration can be suppressed even if the timing of the detection of the NOx concentration is relatively early in the second period.

The voltages Vref0, Vref1, and Vref2 are measured as follows. First, the sensor element 101 is placed in the air, and the heater 72 is powered on to heat the sensor element 101 to a predetermined driving temperature (e.g., 800° C.). No voltage is applied to the variable power supplies 25, 46, and 52 and the power supply circuit 92. Then, after the temperature of the sensor element 101 becomes stable, the voltage Vref is measured, and the value thereof is set as the voltage Vref0. Then, the control voltage Vp3 is started to be set to on state and off state by using the power supply circuit 92 so as to start to pump in oxygen from the outer pump electrode 23 to the reference electrode 42. Then, the waveform of the voltage Vref one minute after the start of pumping in is measured, the maximum value of the voltage Vref is set as the voltage Vref2, and the minimum value thereof is set as the voltage Vref1.

The value of the maximum voltage Vp3max can be determined in advance by experiment or the like so that the peak current Ip3max has a desired value. The reference gas regulation pump cell 90 may detect the peak current Ip3max at a predetermined timing during use of the gas sensor 100 and may control the value of the maximum voltage Vp3max on the basis of the detected value. The predetermined timing may be immediately after the start of use of the gas sensor 100 or each time a predetermined period elapses during use.

The cycle T of the control voltage Vp3 may be, for example, 5 msec or more and 50 msec or less. The duty ratio that is the ratio between the cycle T and the on time Ton (Ton/T) may be 0.1 or more and 0.8 or less. The off time Toff may be 2 msec or more and 10 msec or less. The reference gas regulation pump cell 90 may change at least any of the cycle T, the duty ratio, and the off time Toff during use of the gas sensor 100.

For example, by decreasing the maximum voltage Vrefmax, the residual voltage Vrs during the second period including the fall voltage V10 can be generally decreased. Methods for decreasing the maximum voltage Vrefmax include decreasing the maximum voltage Vp3max and decreasing the on time Ton. By increasing the off time Toff, the second time T2 can be increased. The residual voltage Vrs during the second period can be generally decreased by performing at least one of decreasing the fall time Tf and decreasing the fall voltage V10. As a method for decreasing the fall time Tf, for example, a time constant τ (=R×C) of the circuit of the reference gas regulation pump cell 90 may be decreased. As a method for decreasing the time constant T, for example, an area S of the reference electrode 42 may be increased. As a method for decreasing the fall voltage V10, the maximum voltage Vp3max may be decreased, or the resistance component in the circuit of the reference gas regulation pump cell 90 may be decreased. As a method for decreasing the resistance component in the circuit of the reference gas regulation pump cell 90, for example, the area S of the reference electrode 42 may be increased. The fall residual voltage DVref10 can be decreased by the same method as the method for decreasing the fall voltage V10.

The area S of the reference electrode 42 denotes an area of a part of the reference electrode 42 facing the air introducing layer 48 and is equal to areas of an upper surface and side surfaces of the reference electrode 42 according to this embodiment. The thickness in the vertical direction of the reference electrode 42 is significantly smaller than the length in the front-rear direction and the width in the left-right direction of the reference electrode 42, so that the areas of the side surfaces (front, rear, left, and right surfaces) of the reference electrode 42 are negligible. Therefore, the value of the area S in this embodiment is the area of the upper surface of the reference electrode 42 (length in the front-rear direction×width in the left-right direction). As described above, the time constant T and the resistance component in the circuit of the reference gas regulation pump cell 90 can be smaller as the area S is larger, and for this respect, the area S is preferably 0.4 $mm^2$ or more. The area S is more preferably 1.5 $mm^2$ or more. The larger the area S, the smaller the time constant of the circuit of the reference gas regulation pump cell 90, and the shorter the fall time Tf. Thus, the residual voltage Vrs during the second period is decreased rapidly. The larger the area S, the smaller the resistance components of the reference electrode 42, and the smaller the voltage drop due to the current Ip3 flowed in the reference electrode 42. Thus, the residual voltage Vrs during the second period is decreased. Accordingly, the larger the area S, the more rapidly the residual voltage Vrs during the second period is decreased, and the lower the residual voltage Vrs becomes. Thus, it is likely that the NOx concentration is detected with high accuracy during the second period. An upper limit of the area S can be determined as appropriate in accordance with, for example, the size of the sensor element 101. The area S may be not greater than 5 $mm^2$. The length in the front-rear direction, the width in the left-right direction, and the thickness of the reference electrode 42 are not specifically limited, but the length in the front-rear direction may be, for example, 0.2 to 2 mm, the width in the left-right direction may be, for example, 0.2 to 2.5 mm, and the thickness may be, for example, 5 to 30 μm.

As in the measurement pump cell 41, operations of the main pump cell 21 and the auxiliary pump cell 50 are preferably performed in each cycle T and during the second period. For example, the main pump cell 21 preferably acquires the electromotive force V0 and performs feedback control of the pump voltage Vp0 on the basis of the acquired electromotive force V0 in each cycle T and during the second period. The auxiliary pump cell 50 preferably acquires the electromotive force V1 and performs feedback control of the pump voltage Vp1 based on the acquired electromotive force V1 in each cycle T and during the second period. Thus, the operations of these cells are unlikely to be affected by a change in the potential of the reference electrode 42 caused by the control voltage Vp3.

The following gives the correspondence relationship between the components according to this embodiment and components according to the present invention. The first substrate layer 1, the second substrate layer 2, the third substrate layer 3, the first solid electrolyte layer 4, the spacer layer 5, and the second solid electrolyte layer 6 according to this embodiment correspond to a layered body according to the present invention; the reference electrode 42 corresponds to a reference electrode; the outer pump electrode 23 corresponds to a measurement-object gas side electrode; the air introducing layer 48 corresponds to a reference gas introducing layer; the reference gas regulation pump cell 90 corresponds to a reference gas regulating device; and the measurement pump cell 41 corresponds to a detecting device. The outer pump electrode 23 corresponds to an outer electrode.

In the gas sensor 100 of the embodiment specifically described above, the reference gas regulation pump cell 90 applies the control voltage Vp3 so as to pump in oxygen to the periphery of the reference electrode 42. This compensates for reduction of the oxygen concentration in the periphery of the reference electrode 42. Further, the reference gas regulation pump cell 90 also applies the control voltage Vp3 that is repetitively set to on state and off state, and the measurement pump cell 41 detects the NOx concentration on the basis of the voltage V2 during the second period. This suppresses a decrease of the detection accuracy of the NOx concentration caused by the control voltage Vp3. Thus, the gas sensor 100 can pump in oxygen to the periphery of the reference electrode 42 and can suppress a decrease of the detection accuracy of the NOx concentration caused by the control voltage Vp3 used for pumping in.

In addition, as long as the peak current Ip3max is 10 μA or more, it is likely that the gas sensor 100 sufficiently compensates for reduction of the oxygen concentration in the periphery of the reference electrode 42. As long as the second time T2 is not longer than 10 msec, it is likely that insufficiency of an effect of compensating for reduction of the oxygen concentration in the periphery of the reference electrode 42 is suppressed. As long as the fall time Tf is 3 msec or less, it is likely that the second time T2 is made relatively short or the residual voltage Vrs is sufficiently decreased during the second period while maintaining the detection accuracy of the NOx concentration. As long as the fall residual voltage DVref10 is 55 mV or less, it is likely that the gas sensor 100 detects the NOx concentration with high accuracy during the second period.

The present invention is not limited to the embodiment described above but may be implemented by a diversity of other configurations without departing from the technical scope of the invention.

Figure 5:
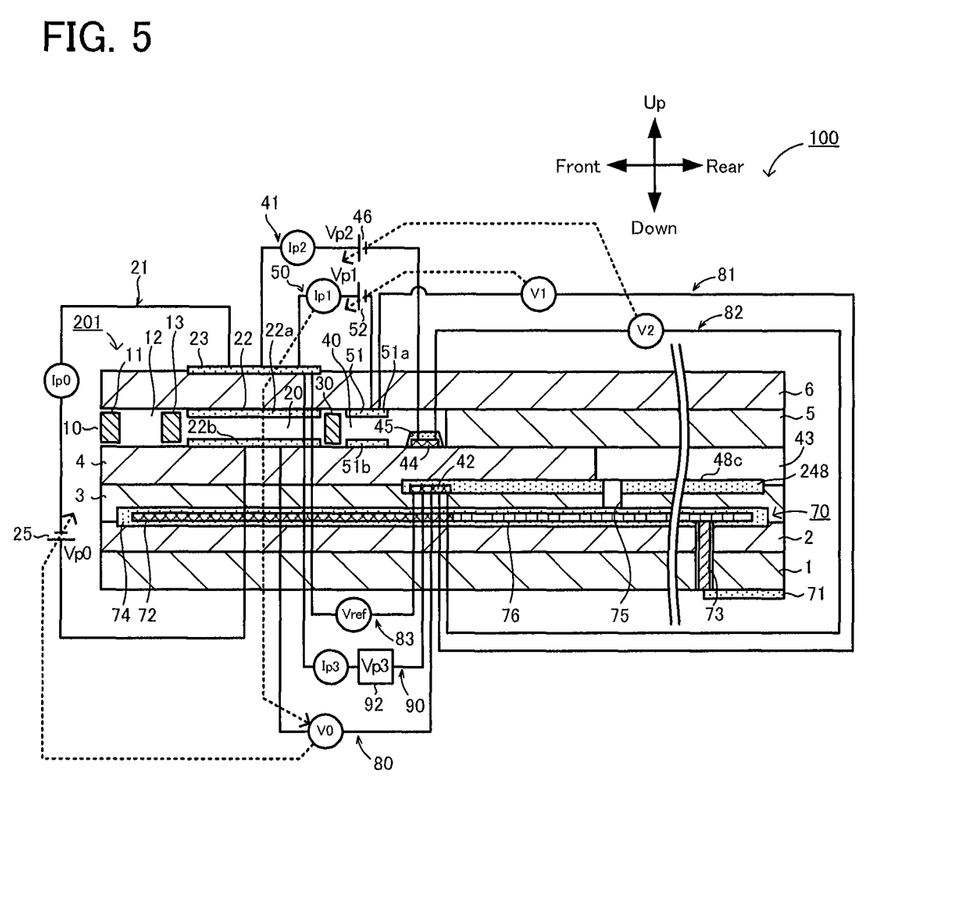
FIG. 5 is a sectional schematic diagram of a sensor element 201 according to a modification.

In the above-described embodiment, the air introducing layer 48 is provided from the reference electrode 42 to the rear end surface of the sensor element 101 in the longitudinal direction, but this is not restrictive. FIG. 5 is a sectional schematic diagram of a sensor element 201 according to a modification of this case. As illustrated in FIG. 5, the sensor element 201 includes a reference gas introducing space 43 above an air introducing layer 248. The reference gas introducing space 43 is a space provided between an upper surface of the third substrate layer 3 and a lower surface of the spacer layer 5. Also, side portions of the reference gas introducing space 43 are defined by side surfaces of the first solid electrolyte layer 4. A rear end of the reference gas introducing space 43 is open to a rear end surface of the sensor element 201. The reference gas introducing space 43 is provided to be ahead of the pressure release hole 75 in the front-rear direction, and the pressure release hole 75 is open to the reference gas introducing space 43. Unlike the air introducing layer 48, the air introducing layer 248 is not provided to a rear end of the sensor element 201. Thus, the air introducing layer 248 is not exposed to the rear end surface of the sensor element 201. Instead, a part of an upper surface of the air introducing layer 248 is exposed to the reference gas introducing space 43. The exposed portion serves as the inlet portion 48c of the air introducing layer 248. The reference gas is introduced to the air introducing layer 248 from the inlet portion 48c through the reference gas introducing space 43. Note that a rear end of the air introducing layer 248 may be provided to the rear end of the sensor element 201 in the sensor element 201.

In the above-described embodiment, the sensor element 101 of the gas sensor 100 includes the first internal cavity 20, the second internal cavity 40, and the third internal cavity 61, but this is not restrictive. For example, as in the above-described sensor element 201 illustrated in FIG. 5, the third internal cavity 61 may be omitted. In the sensor element 201 according to the modification illustrated in FIG. 5, the gas inlet port 10, the first diffusion controlling portion 11, the buffer space 12, the second diffusion controlling portion 13, the first internal cavity 20, the third diffusion controlling portion 30, and the second internal cavity 40 are formed between the lower surface of the second solid electrolyte layer 6 and the upper surface of the first solid electrolyte layer 4 to be adjacent to one another and communicate with one another in this sequence. The measurement electrode 44 is provided on the upper surface of the first solid electrolyte layer 4 in the second internal cavity 40. The measurement electrode 44 is formed by being covered by a fourth diffusion controlling portion 45. The fourth diffusion controlling portion 45 is a film made of a ceramic porous material such as alumina ($Al_2O_3$). The fourth diffusion controlling portion 45 serves to limit the amount of NOx flowing into the measurement electrode 44 as in the fourth diffusion controlling portion 60 according to the above-described embodiment. In addition, the fourth diffusion controlling portion 45 also serves as a protective film of the measurement electrode 44. The top electrode portion 51a of the auxiliary pump electrode 51 is formed immediately above the measurement electrode 44. The sensor element 201 having such a configuration can also detect the NOx concentration by using the measurement pump cell 41 as in the above-described embodiment.

Note that, in the sensor element 201 illustrated in FIG. 5, no modification may be made on the reference gas introducing space 43 and the air introducing layer 248, and the fourth diffusion controlling portion 60 and the third internal cavity 61 may be provided as in the above-described embodiment. In addition, in the sensor element 101 according to the above-described embodiment, no modification may be made on the fourth diffusion controlling portion 60 and the third internal cavity 61, and the same configuration as the reference gas introducing space 43 and the air introducing layer 248 illustrated in FIG. 5 may be employed.

In the above-described embodiment, the outer pump electrode 23 serving as the outer electrode of the measurement pump cell 41 also serves as the measurement-object gas side electrode of the reference gas regulation pump cell 90, but this is not restrictive. The outer electrode of the measurement pump cell 41 and the measurement-object gas side electrode of the reference gas regulation pump cell 90 may be formed separately on the outer surface of the sensor element 101. In addition, as long as the measurement-object gas side electrode of the reference gas regulation pump cell 90 is provided in a portion exposed to the measurement-object gas in the sensor element 101, the providing position is not limited to the outer surface. For example, the measurement-object gas side electrode may be provided in the measurement-object gas flowing portion.

In the above-described embodiment, the voltage Vp2 of the variable power supply 46 is controlled to maintain constant the voltage V2 detected by the measurement pump-controlling oxygen partial pressure detection sensor cell 82, and the concentration of nitrogen oxides in the measurement-object gas is calculated by using the pump current Ip2 under the control. This is, however, not restrictive as long as the specific gas concentration in the measurement-object gas is detected on the basis of the voltage between the reference electrode 42 and the measurement electrode 44. For example, the measurement electrode 44, the first solid electrolyte layer 4, the third substrate layer 3, and the reference electrode 42 may be combined to constitute an electrochemical sensor cell serving as an oxygen partial pressure detecting device. This electrochemical sensor cell is capable of detecting a voltage according to a difference between the amount of oxygen produced by reduction of the NOx component in the ambient atmosphere of the measurement electrode 44 and the amount of oxygen in the periphery of the reference electrode 42 and thereby determines the concentration of the NOx component in the measurement-object gas. In this case, this electrochemical sensor cell corresponds to the detecting device of the present invention.

The reference electrode 42 is formed directly on the upper surface of the third substrate layer 3 in the above-described embodiment, but this is not restrictive. For example, the reference electrode 42 may be formed directly on the lower surface of the first solid electrolyte layer 4.

The reference gas is the air in the above-described embodiment. The reference gas is, however, not limited to this but may be any gas that can be used as a standard for detection of a specific gas concentration in the measurement-object gas. For example, the space 149 may be filled with a gas with an oxygen concentration adjusted in advance to a predetermined value (>oxygen concentration in the measurement-object gas) as the reference gas.

The sensor element 101 detects the NOx concentration in the measurement-object gas in the above-described embodiment, but this is not restrictive. The sensor element may detect any specific gas concentration in the measurement-object gas, for example, the oxygen concentration in the measurement-object gas.

EXAMPLES

The following describes concrete examples of manufacturing gas sensors as examples. Experimental Examples 1 to 9, 11, 12, 14, and 16 to 22 are examples of the present invention. Experimental Examples 10, 13, and 15 are comparative examples. The present invention is, however, not limited to the following examples.

Experimental Example 1

The gas sensor 100 illustrated in FIGS. 1 and 2 was produced by the manufacturing method described above as Experimental Example 1. The ceramic green sheets used for production of the sensor element 101 were formed by tape casting of a mixture of zirconia particles containing 4 mol % yttria as a stabilizing agent with an organic binder and an organic solvent. The green compacts 145a and 145b illustrated in FIG. 1 were compacted talc powder. The air introducing layer 48 was made of ceramic of alumina. The porosity of the air introducing layer 48 was 40 volume %. The area S of the reference electrode 42 was 0.6 mm$^2$. The control voltage Vp3 applied by the power supply circuit 92 of the reference gas regulation pump cell 90 was a pulse voltage with the cycle T being 10 msec, the on time Ton being 2.0 msec, and the off time Toff being 8.0 msec. The maximum of the control voltage Vp3 (maximum voltage Vp3max) applied by the power supply circuit 92 was set to a value with which the peak current Ip3max flowed in the reference electrode 42 by using the control voltage Vp3 became 22 µA. The fall time Tf of the voltage Vref of the sensor cell 83 based on the control voltage Vp3 was 1.5 msec, and the second time T2 was 6.5 msec.

Experimental Examples 2 to 22

Gas sensors of Experimental Examples 2 to 22 were produced in the same manner as Experimental Example 1 for the sensor element 101, except that the area S of the reference electrode 42, the cycle T, the on time Ton, the off time Toff, and the peak current Ip3max were changed in various manners as illustrated in Table 1. The peak current Ip3max was adjusted by changing the maximum voltage Vp3max. Thus, in Experimental Examples 2 to 22, the fall time Tf, the second time T2, and the ratio T2/Tf were changed in various manners from Experimental Example 1.

[Evaluation of Detection Accuracy]

The gas sensor of Experimental Example 1 was mounted to an exhaust gas piping of an automobile. The heater 72 was then powered on to heat the sensor element 101 at a temperature of 800° C. Subsequently, a gasoline engine (1.8 L) of the automobile was operated under predetermined conditions (rotation speed of the engine was 4500 rpm, the air/fuel ratio A/F was 11.0, the load torque was 130 N·m, the gauge pressure of exhaust gas was 60 kPa, and the temperature of exhaust gas was 800° C.). In this state, all the pump cells including the reference gas regulation pump cell 90 were operated, the measurement of the NOx concentration was started, and the reference gas regulation pump cell 90 started to pump in oxygen to the reference electrode 42. The measurement pump cell 41 detected the NOx concentration at a timing as later as possible during the second period in each cycle T. The pump cells other than the measurement pump cell 41 and the reference gas regulation pump cell 90 were also operated in the same cycle as the cycle T, and the operation period was a timing as later as possible during the second period. Immediately after 80 seconds, which is necessary for initial stabilization of the pump cells, elapsed from the start of the operation of all the pump cells, the pump current Ip2 was measured. The pump current Ip2 for Experimental Examples 2 to 22 was measured in the same manner. For each of Experimental Examples 1 to 22, if the measured pump current Ip2 falls within a first allowable range (within a range of 50% to 200% with a correct value being 100%) that is very close to a correct value corresponding to a NOx concentration of 500 ppm in the exhaust gas), the detection accuracy of the NOx concentration was determined as "A". If the measured pump current Ip2 is beyond the first allowable range, the detection accuracy of the NOx concentration was determined as "B".

Table 1 shows the area S, the peak current Ip3max, the cycle T, the on time Ton, the off time Toff, the fall time Tf, the second time T2, the ratio T2/Tf, and the evaluation results of the detection accuracy in Experimental Examples 1 to 22. Table 1 also shows the evaluation results of the pump-in amount of oxygen, which will be described later, in Experimental Examples 1 to 22.

[Evaluation of Pump-in Amount of Oxygen]

As in the above-described detection accuracy evaluation test, the gas sensor of Experimental Example 1 was mounted to a piping, and then the heater 72 was powered on. Subsequently, a gasoline engine of the automobile was operated under the same conditions as those of the above-described detection accuracy evaluation test, and only the reference gas regulation pump cell 90 was operated. This state was maintained for 20 minutes, during which the voltage Vref was measured to determine whether the minimum voltage Vrefmin was decreased to be lower than a predetermined threshold. The threshold was set to 70% of the value at the time of starting measurement of the minimum voltage Vrefmin. If the minimum voltage Vrefmin did

TABLE 1

| | Area S of reference electrode [mm²] | Peak current Ip3max [μA] | Voltage Vp3 | | | Voltage Vref | | | Evaluation results of detection accuracy | Evaluation results of pump-in amount of oxygen |
|---|---|---|---|---|---|---|---|---|---|---|
| | | | Cycle T [msec] | On time Ton [msec] | Off time Toff [msec] | Fall time Tf [msec] | Second time T2 [msec] | Ratio T2/Tf | | |
| Experimental example 1 | 0.6 | 22 | 10 | 2 | 8 | 1.5 | 6.5 | 4.31 | A | A |
| Experimental example 2 | 0.6 | 11 | 10 | 2 | 8 | 1.4 | 6.6 | 4.69 | A | A |
| Experimental example 3 | 0.6 | 110 | 10 | 2 | 8 | 1.6 | 6.4 | 3.98 | A | A |
| Experimental example 4 | 0.6 | 100 | 10 | 2 | 8 | 1.7 | 6.3 | 3.68 | A | A |
| Experimental example 5 | 0.4 | 50 | 10 | 3 | 7 | 1.9 | 5.1 | 2.66 | A | A |
| Experimental example 6 | 1.8 | 27 | 10 | 2 | 8 | 1.3 | 6.7 | 5.13 | A | A |
| Experimental example 7 | 0.4 | 10 | 10 | 2 | 8 | 2.0 | 6.0 | 2.98 | A | A |
| Experimental example 8 | 0.4 | 120 | 10 | 3 | 7 | 2.0 | 5.0 | 2.48 | A | A |
| Experimental example 9 | 0.6 | 150 | 10 | 2 | 8 | 1.5 | 6.5 | 4.31 | A | A |
| Experimental example 10 | 0.4 | 44 | 5 | 2 | 3 | 2.0 | 1.0 | 0.48 | B | A |
| Experimental example 11 | 3.0 | 30 | 5 | 2 | 3 | 0.5 | 2.5 | 4.98 | A | A |
| Experimental example 12 | 0.6 | 18 | 5 | 2 | 3 | 1.4 | 1.6 | 1.11 | A | A |
| Experimental example 13 | 0.3 | 55 | 10 | 5 | 5 | 3.0 | 1.9 | 0.64 | B | A |
| Experimental example 14 | 0.3 | 2 | 20 | 5 | 15 | 2.4 | 12.5 | 5.23 | A | B |
| Experimental example 15 | 0.1 | 33 | 10 | 3 | 7 | 5.0 | 1.9 | 0.38 | B | A |
| Experimental example 16 | 0.3 | 40 | 20 | 3 | 17 | 3.0 | 13.9 | 4.64 | A | A |
| Experimental example 17 | 0.1 | 50 | 20 | 5 | 15 | 5.0 | 9.9 | 1.97 | A | A |
| Experimental example 18 | 0.6 | 9 | 10 | 3 | 7 | 1.8 | 5.2 | 2.87 | A | B |
| Experimental example 19 | 0.2 | 100 | 20 | 2 | 18 | 4.0 | 13.9 | 3.48 | A | A |
| Experimental example 20 | 0.4 | 55 | 20 | 10 | 10 | 2.0 | 8.0 | 3.98 | A | A |
| Experimental example 21 | 1.8 | 11 | 10 | 2 | 8 | 1.0 | 8.0 | 7.95 | A | A |
| Experimental example 22 | 1.8 | 100 | 10 | 2 | 8 | 1.4 | 8.0 | 5.68 | A | A |

As shown in Table 1, in each of Experimental Examples 1 to 9, 11, 12, 14, and 16 to 22 in which the above Formula (1) is satisfied, that is, the ratio T2/Tf is 1 or more, the evaluation of the detection accuracy is A. On the other hand, in Experimental Examples 10, 13, and 15 in which the ratio T2/Tf is less than 1, the evaluation of the detection accuracy is B. These results show that the ratio T2/Tf is preferably 1 or more.

not become lower than the threshold after 20 minutes, the pump-in amount of oxygen was determined as "A". If the minimum voltage Vrefmin became lower than the threshold before 20 minutes, the pump-in amount of oxygen was determined as "B". The minimum voltage Vrefmin for Experimental Examples 2 to 22 was measured in the same manner for evaluation. Note that the operation of the reference gas regulation pump cell 90 supplies the control current Ip3 and pumps in oxygen, so as to compensate for reduction of the oxygen concentration in the periphery of the reference electrode 42 due to penetration of the exhaust gas into the space 149. On the other hand, as the oxygen concentration of the reference electrode 42 is decreased, the oxygen concentration difference between the outer pump electrode 23 and the reference electrode 42 is reduced to decrease the voltage Vref*, and thereby the minimum voltage Vrefmin is also decreased. Accordingly, a high-speed decrease of the minimum voltage Vrefmin over time means that the pump-in amount of oxygen by the reference gas regulation pump cell 90 is insufficient and that the effect of compensating for reduction of the oxygen concentration is insufficient. The above Table 1 shows the evaluation results of the pump-in amount of oxygen in Experimental Examples 1 to 22.

As shown in Table 1, in each of Experimental Examples 1 to 13, 15 to 17, and 19 to 22 in which the peak current Ip3max is 10 μA or more, the evaluation of the pump-in amount of oxygen is A. On the other hand, in Experimental Examples 14 and 18 in which the peak current Ip3max is less than 10 μA, the evaluation of the pump-in amount of oxygen is B. These results show that the peak current Ip3max is preferably 10 μA or more.

The present application claims priority from Japanese Patent Application No. 2017-070702, filed on Mar. 31, 2017, the entire contents of which are incorporated herein by reference.

What is claimed is:

1. A method of operation of a gas sensor having a layered body that is formed by stacking a plurality of oxygen ion-conductive solid electrolyte layers, and that includes a measurement-object gas flowing portion, a reference electrode that is formed inside of the layered body, a measurement electrode provided on an inner peripheral surface of the measurement-object gas flowing portion, a measurement-object gas side electrode provided in a region of the layered body, a reference gas introducing portion, and a reference gas regulating device, comprising the steps of:
   introducing and flowing a measurement-object gas in the measurement-object gas flowing portion;
   introducing a reference gas to the reference electrode, the reference gas being used as a standard for detection of a specific gas concentration in the measurement-object gas;
   exposing the measurement-object gas side electrode to the measurement-object gas;
   introducing the reference gas to a periphery of the reference electrode via the reference gas introducing portion;
   applying a control voltage that is repetitively set in an on state and in an off state between the reference electrode and the measurement-object gas side electrode to pump in oxygen to the periphery of the reference electrode such that a voltage Vref between the reference electrode and the measurement-object gas side electrode reaches a voltage Vrefmax in the on state and then decreases to a voltage Vrefmin in the off state following the on state; and
   detecting the specific gas concentration in the measurement-object gas on the basis of a voltage difference between the reference electrode and the measurement electrode, wherein the voltage difference is determined when the control voltage is applied in the off state and the voltage Vref decreases a predetermined amount from Vrefmax in the off state,
   wherein a first period during which the voltage Vref is 90% or more of the voltage Vrefmax is determined as a first length of time T1 [msec], and a second period T2 is determined during the off state from when the voltage potential Vref falls below approximately 10% of Vrefmax to when the voltage potential Vref starts to rise again in the on state, and the following Formula (1) is satisfied, $$Tf \leq T2 \qquad (1)$$

where a period Tf [msec] is determined as a fall time during the off state in which the voltage potential Vref falls from 90% of the voltage Vrefmax to approximately 10% of Vrefmax.

2. The method of operation of the gas sensor according to claim 1, wherein the control voltage is applied such that Ip3max is a peak current flowed in the reference electrode of 10 μA or more in the on state.

3. The method of operation of the gas sensor according to claim 1, wherein the control voltage is applied such that the second time T2 is 10 msec or less.

4. The method of operation of the gas sensor according to claim 1, wherein the control voltage is applied such that the fall time Tf is 3 msec or less.

5. The method of operation of the gas sensor according to claim 1, wherein the control voltage is applied between the reference electrode and the measurement-object gas side electrode such that a fall residual voltage DVref10 is 55 mV or less and is calculated according to the following Formula (2), $$DVref10 = (Vref2 - Vref1) \times 0.1 + (Vref1 - Vref0) \qquad (2),$$

where Vref0 is a voltage difference [mV] between the reference electrode and the measurement-object gas side electrode when the layered body is placed in an air and the control voltage is applied in the off state,
   Vref1 is a minimum voltage difference [mV] between the reference electrode and the measurement-object gas side electrode when the layered body is placed in the air and the control voltage is applied repetitively in the on state and off state, and
   Vref2 is a maximum voltage difference [mV] between the reference electrode and the measurement-object gas side electrode in the on state when the layered body is placed in the air and the control voltage is applied repetitively in the on state and off state.

* * * * *